Feb. 24, 1970   B. P. L. AMIET   3,497,387
ELECTROCHEMICAL CELLS WITH NEGATIVE ZINC ELECTRODES
Filed Dec. 27, 1966

INVENTOR
BERNARD PAUL LOUIS AMIET
BY
ATTORNEYS

United States Patent Office 3,497,387
Patented Feb. 24, 1970

3,497,387
ELECTROCHEMICAL CELLS WITH NEGATIVE ZINC ELECTRODES
Bernard Paul Louis Amiet, Vaucresson, France, assignor to Societe des Accumulateurs Fixes et de Traction (Societe Anonyme), Romainville, Seine-St.-Denis, France, a company of France
Filed Dec. 27, 1966, Ser. No. 604,745
Claims priority, application France, Dec. 2, 1966, 86,037; Dec. 30, 1965, 44,415
Int. Cl. H01m 41/00, 17/00, 13/06
U.S. Cl. 136—30                                16 Claims

ABSTRACT OF THE DISCLOSURE

The disclosure relates to electrochemical and secondary cells utilizing negative electrodes primarily of zinc and provides means for effectively preventing treeing of zinc during operation of the cell and over its entire life thereby eliminating short circuits by needles or dendrites created by the treeing and prolonging also the useful life of the cell. This treeing is eliminated by inclusion between electrodes of opposite polarity of a layer in intimate overall contact with the negative zinc electrode comprising a metal more electro-positive than zinc or a conductive metalloid such as carbon, said metal or metalloid being capable of forming an electrochemical couple with zinc in the presence of oxygen within the cell to oxidize the trees, needles or dendrites as they form during cell operation. Additionally, a barrier of semi-permeable material may be provided to preclude migration of dissolved zinc to the electrolyte which is preferably immobilized in the separator. The layer may be a fabric of fibers of said more electropositive metals such as nickel or silver or of synthetic polyamidic material plated with such metals or a felted fabric of carbon in the form of graphite or porous layers of small particles of dispersed carbon or of active charcoal or of graphite agglomerated by an insulating, preferably hydropholic binder. The semi-permeable barrier may be a film of regenerated cellulose or polyvinyl alcohol, for example.

RELATED APPLICATIONS

A related application assigned to the same assignee as this application in the name of Jean Firmin Jammet, Ser. No. 611,201, filed Dec. 22, 1966 and entitled Manganese Dioxide-Zinc Alkaline Secondary Cell, is currently pending, now Patent No. 3,463,669, issued Aug. 26, 1969.

A second related application assigned to the same assignee as this application in the name of Douchan Stanimirovitch Ser. No. 604,618, filed Dec. 27, 1966, now Patent No. 3,451,851 and entitled Negative Zinc Electrodes for Secondary Cells is also currently pending.

A third related application assigned to the same assignee as this application in the name of Jean Firmin Jammet Ser. No. 428,714, filed Jan. 29, 1965, now Patent No. 3,342,644 and entitled Improved Sealed Electrochemical Cell is also currently pending.

BRIEF SUMMARY OF INVENTION

The present invention relates to improvements in electrochemical cells and more especially to secondary cells provided with negative electrodes made wholly or mainly of zinc.

Zinc electrodes have a tendency to become spongy and to tree, i.e. form into the shape of needles, dendrites, proliferations or filaments during charging, thus causing a premature failure due to short circuits between two adjacent electrodes of opposite polarities.

It has already been suggested to provide a mechanical barrier against these short circuiting bridges by including in the separator at least one semi-permeable barrier layer or film which permits passage of electrically charged ions therethrough but stops passage of zinc particles. Such films may, for example, be made of regenerated cellulose or polyvinyl alcohol. However, such zinc treeing in the shape of needles or dendrites, for example, exerts a pressure on the semi-permeable barrier which eventually results in a piercing breakthrough, so that occurrence of short circuits is merely delayed but not prevented.

It has also been suggested to provide a barrier against such zinc treeing or crystal growth by the addition to the separator of substances such as cadmium hydroxide, which form an electrochemical couple with the zinc, oxidizing the zinc that comes into contact with it. But experience shows that this means only works for a short time since once formed the metallic cadmium remains substantially in the metallic state and no longer plays the part of an anode relatively to the cathode constituted by the zinc needles or trees. This method which was disclosed in the French Patent No. 1,177,402 has therefore had only a limited advantage since cadmium hydroxide cannot be regenerated.

One improvement in zinc electrodes according to the present invention contemplates a means to provide for a permanent action to oxidize zinc needles or trees as formed.

According to this improvement, a layer comprising either a metal more electro-positive than zinc in a divided and dispersed state, capable of forming with metallic zinc an electrochemical couple operating with the oxygen present in the electrolyte, or a conductive metalloid such as carbon, advantageously graphite, which also forms an electrochemical couple with zinc in the presence of oxygen is placed adjacent to the zinc electrode, between the said electrode and the associated positive electrode. Thus zinc trees or needles are oxidized as they tend to form and treeing is effectively prevented throughout the life of the cell which is itself prolonged because hazards of separator piercing and short circuits by such trees is entirely eliminated.

Thus, a zinc needle, dendrite, filament or tree as formed come into contact in the layer with such a more electro-positive metal or metalloid such as carbon and an electrochemical couple is then created forming a cell, the negative electrode of which is constituted by the zinc needle, tree or dendrite and the positive electrode by the metalloid such as carbon or the said more electropositive metal. Zinc of the needle or other tree is thus oxidized through anodic action. The continuity of the process is due to the oxygen present either in the dissolved state in the electrolyte, or even in the gas state, in the internal cell atmosphere.

The required oxygen for oxidizing the zinc needles or other trees is supplied from oxygen dissolved in the electrolyte which in its own way is derived either from the gas space of the cell from the air therein, or from the oxygen evolved on the positive electrode at end of charge or overcharge. Oxygen evolved at the positive electrode at the end of charge or on overcharge of the cell is particularly advantageous since it is evolved just at the time when the tendency of zinc needles or trees to grow is most pronounced. It must be noted that only a small amount of oxygen may sometimes be required for stopping the growth of needles or other trees.

Suitable electropositive metals are, for example, nickel and silver, provided that they are in a very finely divided state, i.e. so that their total area is very large.

One preferred, but not exclusive embodiment of the invention, consists in providing a porous conductive carrier layer constituted by fibers of the said metals or of graphite located immediately adjacent and preferably in intimate overall contact with the negative electrode. The filaments or metallic fibers of the layer, however, may be replaced by synthetic fibers that have been suitably metal plated with the required electropositive metals.

These layer-like carriers made of metal fibers, metallized (plated synthetic) fibers or graphite fibers are advantageously in the form of fabrics that are preferably felted, and, which, therefore, are sufficiently flexible to permit their deformation and compression. The deformation may correspond to folding even up to 180° and their compression on assembly or to insure overall contact with the negative electrode, may reduce their initial thicknesses down to from one-half to two-thirds of their initial values. The diameters of the fibers constituting such carriers may be only a few times ten microns, an advantageous value being about 10μ.

As any said conductive carrier is in close overall contact with the negative electrode over its whole active surface, its conductivity should advantageously not be too high, or at least should be lower than that of the actual electrode carrier. Thus, the electrochemical reactions at the beginning of a charge will proceed at first on the more conductive carrier, i.e., the electrode carrier. It is well known that an ohmic drop in a conductive circuit leads to a lag in the corresponding electrochemical process, therefore, it is particularly advantageous to use either carbon fibers, or slightly metallized synthetic fibers, the latter being all the less metallized as the deposited electro-positive metal is more conductive.

According to an embodiment of the invention, the felted fabric either of metal or of metallized fibers or of carbon projects above the electrolyte level. According to another embodiment, the fabric may be rendered at least partly unwettable by a suitable treatment. Both means may be simultaneously used to obtain a maximum effect.

Metal plating of ion conductive fibers made of a material unalterable in the chemical conditions prevailing in the cells, may be obtained by various means, more especially by chemical means in known manner.

Thus, in order to provide a fabric with nickel plated fibers, a plastic fabric of polyamidic material, previously washed and activated by hydrochloric solutions of stannous chloride, and then by palladium chloride is immersed in a nickel chloride solution which is reduced by sodium hypophosphite with sodium citrate at about pH 5 to effect the required plating of nickel on the fibers.

For silver plating of fibers of such plastic materials, a silver nitrate solution is reduced, for example, by hydrazine.

The metal plated fibers may be rendered unwettable by the use of polystyrene or polytetrafluorethylene, for example, this only requires impregnating with a solution of polystyrene in trichlorethylene or of polytetrafluorethylene in a solvent and then evaporating the solvent as, for example, in a drying oven.

An embodiment of the invention as just described used for an example in manufacturing an improved alkaline silver-zinc cell will be described below.

The improvement in electrochemical cells and secondary cells comprising one or several negative zinc electrodes, which has just been described, consists in providing, adjacent to each zinc electrode or in direct intimate contact with it, between this electrode and the associated positive electrode, a layer comprising either a metal more electropositive than zinc or a conductive metalloid such as carbon, advantageously in graphite form in a divided and dispersed state, the said metal or metalloid being able to constitute an electrochemical couple with zinc in the presence of oxygen, which tends to oxidize the zinc and thus prevents the formation of zinc needles or trees between the negative electrode and the positive electrode.

This description also relates to a particularly advantageous embodiment which consists in using graphite in the form of a fabric or a felt in contact with the zinc negative electrode.

Experience has shown that no zinc deposit and no proliferation of this metal takes place from the negative electrode into the graphite layer, which establishes the value of the invention.

However, it has been observed that, in a storage cell according to the invention, so far described, a zinc deposit could be formed during charging on the graphite fabric surface which is on the side other than that of the zinc electrode and which will be called "outer surface" of the graphite fabric in what follows, though this surface is situated inside the block constituted by the assembled electrodes of the cell.

This drawback is probably due to the fact that the electrolyte contains zinc in the state of a dissolved zinc salt, more especially potassium zincate in the case of an alkaline storage cell, and that the said zinc salt freely circulates through the graphite fabric since it is carried by the electrolyte.

As a consequence, when current is passing through the electrolyte from the positive electrode to the negative electrode, which is the case when a cell is charged, the zinc existing in the electrolyte outside the graphite fabric can be deposited on the outer surface of the graphite; the potential of this surface is suitable at that time since the conductive graphite fabric is in contact with the negative electrode.

A further improvement aimed at preventing the zinc from depositing on the outer surface of the porous layer covering the negative electrode is contemplated.

This improvement consists in providing means for ensuring the continuity of the electrolyte from one electrode to the other and, simultaneously, for preventing the dissolved zinc from migrating out of a space or compartment enclosing the zinc electrode and which is limited by the outer surface of the porous layer associated with this electrode.

This means may consist of a semi-permeable barrier, e.g. made of regenerated cellulose or polyvinyl alcohol, provided either on the outer surface of the porous layer, or on the surface of the zinc electrode itself. The said semi-pearmeable barrier allows the electrolyte to pass through it but prevents the passage of zinc in the state of a dissolved salt.

According to this aspect of the invention, the zinc in the state of a dissolved salt then is confined in said compartment and has no access beyond the outer surface of the graphite and cannot reach the electrolyte containing separator or the positive electrode.

Advantageously this semi-permeable barrier may be shaped so as to envelop either the negative electrode only, or the assembly of negative electrode-graphite layer, so that the required zincous salt filtration is ensured at all places and times.

Another object and feature of the present invention consists in using porous graphite layers other than in the form of fabrics.

Other objects and features of the invention will become apparent from the following detailed description and the accompanying drawings presented as non-cumulative examples and forming part hereof, wherein.

Figure 1:
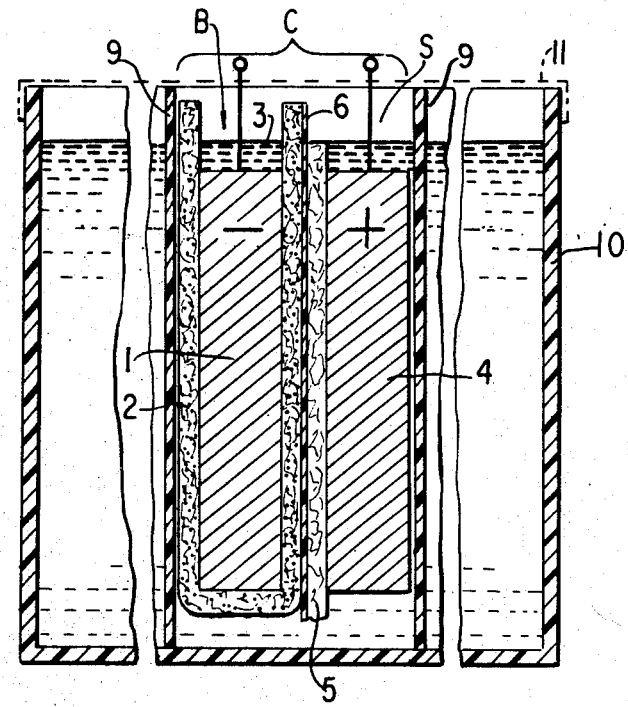
FIGURE 1 is a partially diagrammatic vertical section of a cell assembly including a positive and negative electro-separator-layer assembly illustrating one embodiment of the invention.

Referring to the drawing and first to FIGURE 1, it illustrates in detail, one cell C of a battery of such cells including an assembly block B of a positive electrode and a negative electrode as part of such cell.

In this figure, 1 is a negative zinc or mainly zinc electrode around which a flexible sheet 2 of felted graphite fibers of generally U-shaped configuration is folded or wrapped with its upper ends slightly projecting beyond the electrode boundaries above the electrolyte level 3 in said cell. The said felted graphite sheet 2 which is composed of tangled fibers having a diameter of about 10μ, on assembly is compressed between the negative electrode and the adjacent positive electrode 4 so that its final thickness is reduced to about one-half to two-thirds of its initial value. The positive silver electrode 4 is insulated as by a felted nylon or other polyamidic separator from the assembly parts comprising the electrode 1 and the felted sheet 2 of said block B.

Preferably, a barrier film 6 composed, for example, of a semi-permeable substance such as regenerated cellulose or polyvinyl alcohol is positioned directly against the felted graphite sheet 2 lying between it and the separator 5. This separator 5 is of conventional porous material such as nylon or other polyamidic material in which suitable electrolyte such as potassium hydroxide, with or without zinc oxide additives may be imbibed or else the electrolyte may be present as free electrolyte.

The block B is enclosed between insulating partitions 9 in a casing 10 which may be closed as by a cover 11 in conventional ways after assembly with a space S above the upper ends of the block B for oxygen containing gas.

This FIGURE 1 illustrates the first embodiment of the invention described hereinabove.

Figure 2:
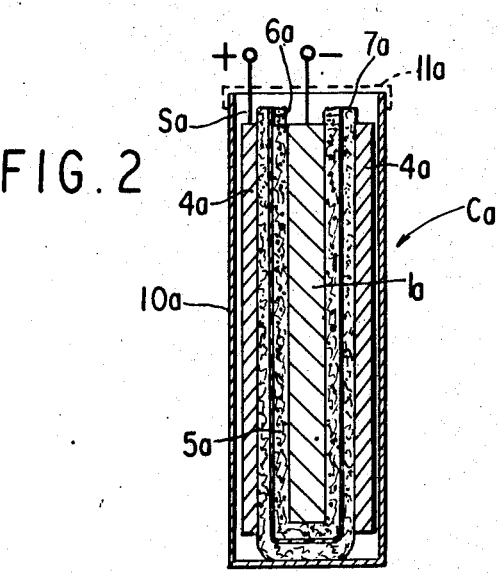
FIGURE 2 is a vertical cross-section of an alkaline silver-zinc cell illustrating a second embodiment.

Referring now to FIGURE 2:

The alkaline storage cell Ca shown in FIGURE 2 comprises a negative zinc or mainly zinc electrode 1a associated with two positive silver electrodes 4a which are located respectively on the two side faces of the zinc electrode, the whole assembly being enclosed in an insulating container 10a. The negative electrode 1a is completely wrapped or enveloped except at its upper boundary edges in a sheet 5a made of graphite fiber felt which is in direct overall contact with the surfaces of this negative electrode.

On its external surface, the graphite fiber felted sheet 5a is lined in its entirety with a semi-permeable barrier 6a, which may be a film, for example, either of regenerated cellulose or of polyvinyl alcohol. Between this barrier 6a and each of the positive electrodes 4a there is a porous separator 7a as, for example, of nylon or other polyamidic fibers containing alkaline electrolyte, e.g. potassium hydroxide with or without zinc oxide additive imbibed in its pores thus immobilizing the electrolyte, so that there is no free electrolyte in the cell Ca.

At the upper part of the container 10a, the semi-permeable barrier 6a projects slightly above the electrode end surfaces or boundary edges and so does the layer 5a, the free edges of which extend into the space Sa in the cell casing 10 above the electrode boundaries and which contains oxygen. It can be seen that in such conditions, the semi-permeable barrier film 6a defines a compartment around the negative electrode 1a, enclosing all dissolved zinc therein and preventing it from migrating to the immobilized electrolyte contained in the separator 7a, so as to preclude dissolved zinc from reaching the positive compartment from which it could be deposited on the outer surface of the graphite sheet 5a during charging of the cell.

The electrodes 4a may have the shape of plates or of concentric cylinders in which latter case the graphite sheet 5a, the semi-permeable barrier 6a and the separator 7a would also be cylindrical, as would casing 10a. After insertion of the electrodes, graphite sheet 5a, barrier film 6a and separator 7a into casing Ca, the latter is closed in conventional ways as by a cover 11a.

Figure 3:
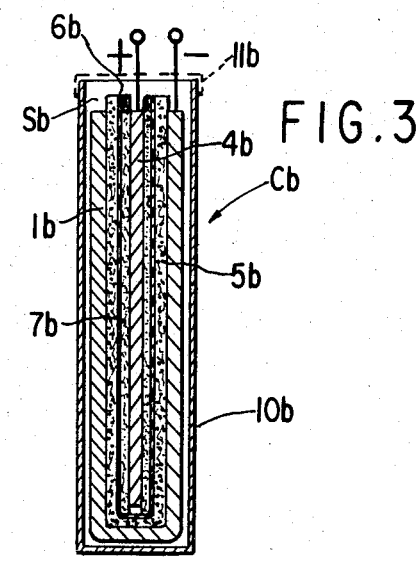
FIGURE 3 is a similar view of an alkaline silver-zinc cell illustrating a further embodiment.

In another cell embodiment Cb shown in FIGURE 3, the positive silver electrode 4b is surrounded by the negative zinc electrode 1b, which is folded in substantially U-shape. Adjacent to the negative electrode 1b and in contact with it, the porous graphite sheet or layer 5b, the outer surface of which is covered by the semi-permeable barrier film 6b is also folded in a substantial U-shape. The porous separator 7b is also of substantially U-shape and is folded around the positive electrode 4b. It contains the said immobilized electrolyte imbibed therein. Here again, the upper ends of the layer 5b and barrier 6b project into the free gas space Sb. The casing 10b of insulating material after assembly in it of these components is closed in conventional ways as by a cover 11b.

Figure 4:
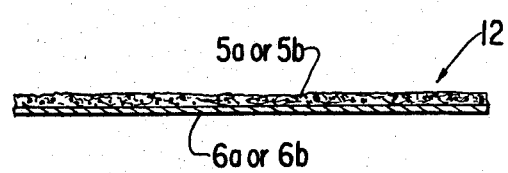
FIGURE 4 illustrates details of construction of the embodiments either of FIGURES 2 or 3.

The manufacture of such cells Ca or Cb, can be made relatively easy if the graphite fabric sheet 5a or 5b is first adhered to the semi-permeable barrier film or membrane 6a or 6b so as to obtain composite sheet 12 (FIGURE 4). Such a composite sheet 12 then can be folded around the negative electrode 1a of FIGURE 2 with the graphite fabric 5a lying adjacent to this electrode, in order to obtain the cell Ca shown in FIGURE 2. Alternatively, such a composite sheet 12 may also be placed against the negative electrode 1b of FIGURE 3 previously laid out flat, the whole being then U-folded around the positive electrode 4b to obtain the cell Cb shown in FIGURE 3.

Another embodiment (not illustrated) may consist in applying the semi-permeable barrier film or membrane 6a or 6b directly onto the outer surface of the zinc electrode 1a or 1b, for example, by dipping such electrode into a polyvinyl alcohol solution and then drying it to obtain a semi-permeable barrier layer or film on the zinc, and then covering the negative electrode 1a or 1b thus protected with a porous layer or sheet 5a or 5b of graphite, means being provided for ensuring the electrical contact of this layer with the zinc of the negative electrode.

In the embodiments hereinabove described, as in those of the embodiment of FIGURE 1, the graphite fabric or sheet may be replaced by any other kind of porous layer, for instance, by a layer made of small particles either of carbon or of active charcoal or of graphite agglomerated by an insulating, preferably hydrophobic binder. This binder may be, e.g. polystyrene dissolved in trichloroethylene.

A layer of a paste prepared with graphite powder and such binder is applied on the zinc electrode, which is then placed, for example, in an oven in order to eliminate the trichloroethylene solvent by evaporation, the resulting mass having a uniform porosity.

In another embodiment of this invention, the semi-permeable barrier layer or film is prepared first and grains either of carbon or of active charcoal or of graphite are embedded by pressure into this layer; this embedding may be made by pressing a layer of these grains into the semi-permeable layer, preferably on one side only.

While specific embodiments of the invention have been disclosed, variations within the scope of the appended claims are possible and are contemplated. There is no intention, therefore, of limitation to the exact disclosure herein presented.

What is claimed is:

1. That improvement in electrochemical secondary cells containing a positive electrode, at least one negative electrode primarily of zinc, a separator, alkaline electrolyte and oxygen therein to eliminate treeing of the zinc by oxidation of trees as formed during operation of such cells comprising a layer adjacent each negative electrode in intimate contact therewith, said layer being porous and having a conductivity lower than the conductivity of the negative electrode and constituted by an electrochemical material selected from the group consisting both of insulating fibers coated with a metal more electropositive than zinc and of carbon, said material being capable of forming with the zinc an electrochemical couple owing to presence of said oxygen.

2. That improvement in electrochemical secondary cells according to claim 1, wherein said metal is selected from the group consisting of nickle and silver.

3. That improvement in electrochemical secondary cells according to claim 1, wherein said carbon is selected from the group consisting of graphite, finely divided active carbon and charcoal.

4. That improvement in electrochemical secondary cells according to claim 1, wherein said electrochemical material is a fibrous fabric.

5. That improvement in electrochemical secondary cells according to claim 4, wherein said fibrous fabric is a mass of entangled, felted fibers.

6. That improvement in electrochemical secondary cells according to claim 4, wherein said fibrous fabric is a mass of fibers bearing a plating of a metal that is more electropositive than zinc.

7. That improvement in electrochemical secondary cells according to claim 1, including a semi-permeable barrier between the separator and said layer.

8. That improvement in electrochemical secondary cells according to claim 1, wherein said positive electrode is primarily of silver and said electrolyte is an alkali hydroxide.

9. A secondary electrochemical cell comprising at least one positive electrode, at least one negative electrode primarily of zinc, alkaline, electrolyte, a separator between the electrodes, a conductive layer having a conductivity lower than that of the negative electrode and containing a more positive electrochemical substance than zinc positioned in intimate contact with the negative electrode and between it and said separator, and a barrier of semi-permeable material between said separator and the more positive layer.

10. A secondary electrochemical cell according to claim 9, wherein said layer comprises fibrous material selected from the group consisting of metals more electropositive than zinc and metalloids, all capable of forming electrochemical couples with zinc as a result of the presence of oxygen in the cell to eliminate treeing of zinc of the negative electrode during operation of said cell.

11. A secondary electrochemical cell according to claim 10, wherein said metals are selected from the group consisting of silver and nickel.

12. A secondary electrochemical cell according to claim 10 wherein said metalloids comprise carbon selected from the group consisting of graphite, finely divided active carbon and charcoal.

13. A secondary electrochemical cell according to claim 9, wherein said semi-permeable barrier is a film selected from the group consisting of regenerated cellulose and polyvinyl alcohol.

14. A secondary electrochemical cell according to claim 9, wherein said separator is of porous polyamidic material in which said electrolyte is immobilized.

15. A secondary electrochemical cell according to claim 9, wherein said layer is wrapped about said negative electrode and compressed subsequent to being wrapped about it to insure intimate overall contact with it and wherein said layer and barrier have ends projecting beyond boundary edges of said electrodes into an oxygen containing space in said cell.

16. A secondary electrochemical cell according to claim 9, wherein said layer is wrapped about said positive electrode and said negative electrode is mounted about said positive electrode and in overall intimate contact with said layer and wherein said layer and barrier have ends projecting beyond boundary edges of said electrodes into an oxygen-containing space in said cell.

References Cited

UNITED STATES PATENTS

| | | | |
|---|---|---|---|
| 25,503 | 9/1859 | Grenet | 136—140 |
| 401,291 | 4/1889 | Main | 136—31.1 |
| 651,247 | 6/1900 | Hess | 136—86 |
| 2,662,928 | 12/1953 | Brennan | 136—31 |
| 2,669,594 | 2/1954 | André | 136—31 |
| 2,988,586 | 6/1961 | André | 136—30 |
| 3,013,099 | 12/1961 | Mendelsohn | 136—148 |
| 3,053,924 | 9/1962 | Strauss | 136—30 |
| 3,207,682 | 9/1965 | Oswin | 136—86 |
| 3,275,478 | 9/1966 | Rosser | 136—148 |

WINSTON A. DOUGLAS, Primary Examiner

PETER D. ROSENBERG, Assistant Examiner

U.S. Cl. X.R.

136—102, 125, 140, 143